April 19, 1966 H. PFAU 3,246,389
APPARATUS FOR MAKING ROTORS
Original Filed Feb. 20, 1962

INVENTOR.
HANS PFAU
BY
McGlew & Toren
ATTORNEYS.

United States Patent Office 3,246,389
Patented Apr. 19, 1966

3,246,389
APPARATUS FOR MAKING ROTORS
Hans Pfau, Duisburg, Germany, assignor to Demag Aktiengesellschaft, Duisburg, Germany
Original application Feb. 20, 1962, Ser. No. 174,621. Divided and this application June 3, 1964, Ser. No. 387,541
1 Claim. (Cl. 29—200)

This application is a division of application, Serial No. 174,621, filed February 20, 1962, for Process and Apparatus for Making Rotors.

This invention relates, in general, to rotor constructions and to a method of forming a rotor, and in particular to a new and useful rotor construction for an axial flow turbine compressor and similar device, and to a method of forming such rotor.

In the manufacture of rotors for axial turbines and axial compressors, it is essential that extreme care be taken to insure the stability and strength of the rotors which are formed. The requirements with regard to strength and stability are particularly difficult to meet in respect to the securing of the lower portions or feet of the rotors.

Prior to the present invention, it has been established that the greatest stability is obtained in a rotor construction where the vanes and the hub consist of a single piece. However, the manufacture of such a rotor in a single piece is very difficult.

In accordance with the present invention, an improved rotor construction is provided by a process in which the vanes are joined together individually one after the other and welded at their feet along lines extending parallel to the axis or on a coaxial cylinder surface of the rotor. To accomplish this, an apparatus is provided to mount one of the vanes on a rotary member having indications thereon corresponding to the number of vanes which will eventually be formed into the rotor. An additional vane is then mounted in a clamping member and the two are brought together so that the feet align on each side. Thereafter, welding is accomplished along the juncture between feet in a direction parallel to the axis or on a coaxial surface of the rotor to be formed. Additional vanes are connected one at a time in the same manner. When all of the vanes have been welded together, a vane ring is formed by the connections of the rotor feet. The vane ring is subsequently connected with a hub body by means of one or more annular welding seams made to connect the hub body to the vane ring.

The process is advantageously carried out using the apparatus by securing a first vane or a complete segment of vanes to the rotatable arm in such a manner that the vanes which have been connected together may be swung through an arc to align with the next vane which is positioned in a stationary clamping member. An advantage of the method is that each vane, as it is welded to the other vanes in the already formed segment, is relieved from the clamping device so that no internal pressures will be built up and it will be permitted to freely expand and cool.

The process proposed in the present invention prevents the occurrence of partial joints between the individual vane feet which may be apt to cause localized stress areas which may fail. This results in a very considerable advantage providing a vane ring which is capable of absorbing tangential stresses and tensions and the danger of radial crevice or cleavage formation during the production of the annular seam is entirely prevented.

With such a process, it is possible to use all types of materials which are capable of being welded. The finished rotor does not contain any joints and therefore, for practical purposes, it is in an ideal state similar to a rotor which has been made from a single piece. In addition, it is possible, in accordance with the inventive process, to make a precise division between the individual vanes of the overall rotor construction.

Accordingly, it is an object of this invention to provide an improved process for manufacturing a rotor.

A further object of the invention is to provide an improved device for facilitating the manufacture of rotors.

A further object of the invention is to provide an improved process for manufacturing a rotor for an axial compressor, turbine and the like, comprising joining together individual blades of the rotor one after the other at their feet by welding along lines substantially parallel to the axis or on a coaxial cylinder surface of the rotor which will eventually be formed and thereafter joining the ring of blades thus formed to a central body member by welding.

A further object of the invention is to provide a rotor construction which includes a plurality of individual rotor blades having foot portions which are joined together along welding seams extending substantially parallel to the axis or on a coaxial cylinder surface of the formed rotor and includes a central hub body which is joined to the ring of rotor blades by welding.

A further object of the invention is to provide an apparatus for welding individual blades of a rotor together to form a complete rotor ring structure including a rotatable arm, an indicator ring having graduations thereon corresponding to the number of vanes formed in the rotor, clamping means on the arm for clamping a blade or a segment comprising a plurality of blades thereon and means for clamping an individual rotor blade adjacent the rotatable arm for joining each individual blade in succession to form an overall rotor ring.

A further object of the invention is to provide an improved process for manufacturing a rotor which is simple to execute, economical to carry out and produces an improved rotor structure.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
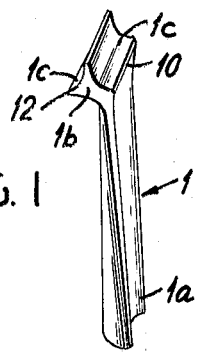
FIG. 1 is a perspective view of an individual rotor vane constructed in accordance with the invention.
Figure 3:
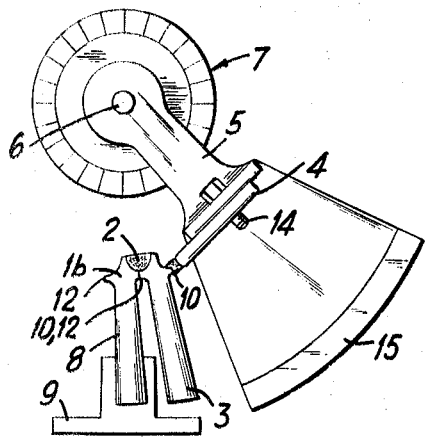
Figure 5:
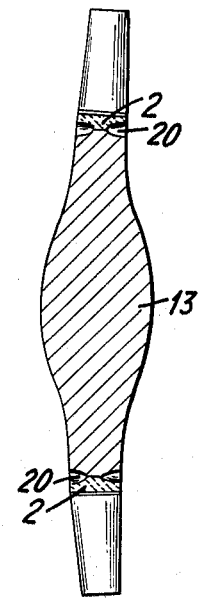
Figure 4:
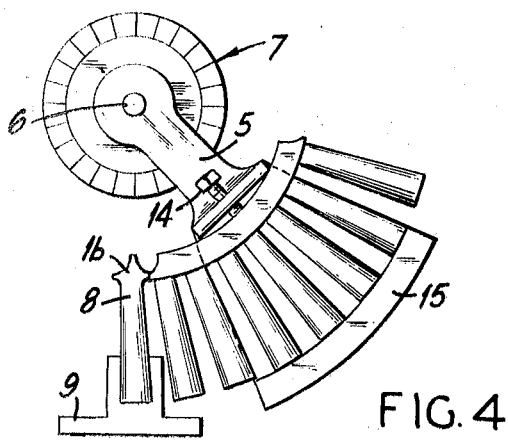

FIG. 3 indicates an apparatus for holding two rotor blade elements together for joining together by welding constructed in accordance with the invention;

FIG. 4 is a view of the apparatus of FIG. 1 indicating a segment held by the apparatus for joining together of an additional vane thereto; and FIG. 5 is a transverse section of a rotor constructed in accordance with the invention.

Referring to the drawings in particular, the invention embodied therein as indicated in FIG. 1 includes a rotor which is made up of a plurality of blades or vanes generally designated 1 which includes a blade portion 1a and a foot portion 1b. The foot portion is elongated in an axial direction in respect to the overall rotor which will be formed and includes curved sides 1c, 1c which form fillers to receive a weld in accordance with the invention.

Figure 2:
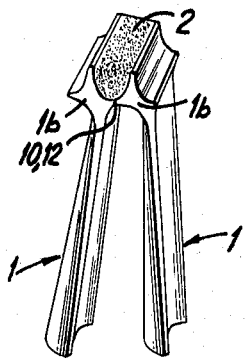
FIG. 2 is a perspective view indicating the joining together of two vanes by welding.

In accordance with the invention, a ring formed of rotor blades is made by placing two of the rotor blades 1 together as indicated in FIG. 2 with an axial elongated edge 10 of one abutting an axially elongated edge 12 of the other. In this position, they are welded together in a jointless manner by welding as indicated at 2 to completely fill the space formed between the curved portions 1c, 1c of adjacent vanes 1.

As indicated in FIG. 3, the preferred apparatus for carrying out a preferred form of the method is indicated. The apparatus includes an indicating ring generally designated 7 upon which is rotatably mounted on a pin 6 a rotating clamping arm 5. The clamping arm 5 is initially provided with a holding piece element 4 which is bolted thereto by means of a bolt 14. To effect the formation of the rotor wheel, a first rotor element 3 is welded to the piece 4 which is secured on the end of the rotatable arm 5. A second rotor blade element 8 is then clamped in a clamping device 9 and the arm 5 is rotated to cause the blade element 3 to be positioned with its elongated axial edge 12 adjacent the elongated axial edge 10 of the blade element 8. When this is done means on the opposite side of the indicator disc (not shown) are provided to secure the pin 6 against turning in order to lock the arm 5 in its aligned position. Thereafter, the blade elements 3 and 8 are joined together by a welding seam made between opposing side faces 1c, 1c of the foot portions along a line extending substantially parallel to the axis of the rotor which will be formed.

After a full quarter segment of the rotor is formed by joining together a plurality of the vane element in the manner described above, a complete quarter segment 15 is mounted on the arm 5 by suitable clamping means (not shown) after piece 4 is first removed. Additional vanes are added to the segment 14 until a complete ring is formed by joining together all the vane feet. During the manufacture of the complete rotor, care has to be taken that each vane is exactly positioned in the proper alignment with the segment which has already been formed. The apparatus which includes the rotatable arm insures that accurate alignment will be accomplished. In order to insure that the segment 15 is accurately positioned on the arm 5, the arm 5 is first rotated up to the mounting position of the first and then rotated to the mounting position of the last vane. The indicated disc 7 is then adjusted with regard to the division between the vanes and the welding of all the additional vanes is then set by positioning the arm 5 in relation to the indicated disc 7.

In the process of the invention, it is possible to insure that the same relative position in relation to the center of the rotor which is to be formed is achieved for each of the vane elements. Thus, any inaccuracies or form changes which may occur during the welding of each individual vane element will not be additive. Thus, upon securing of a new vane in position, any displacement or misalignment which has occurred during the preceding welding which may be due, for example, to shrinking or stress relieving due to temperature changes or the like is automatically reconsidered by the accurate positioning of the arm 5 so that an absolute uniform vane ring is formed. An important step in the process is that each vane element, after it is welded to the segment, is released from its clamping member and permitted to expand and cool so that no stresses are locked into the rotor which is formed. By permitting each vane element to freely expand after it has been welded, the resultant rotor will be free of any tensions or stresses which may cause failure during its operation.

After a complete ring of vane elements is formed, it is placed around a hub member or body 13 as indicated in FIG. 5 and the two structures are welded together by making annular welding seams at the location 20 of FIG. 5.

While a specific embodiment of the invention has been shown and described in detail to illustrate the application of the invention principles, it will be understood that the invention may be embodied otherwise without departing from such principles.

What is claimed is:

An apparatus for welding individual blades of a rotor together to form a complete rotor ring structure, including a stationary blade clamp, an arm rotatably mounted adjacent said clamp including means to hold at least one blade thereon, and a disc mounted concentrically with said arm having indications thereon at angularly spaced locations equal to the number of blades in the rotor.

References Cited by the Examiner
UNITED STATES PATENTS
2,448,825   9/1944   Price et al. _____ 253—77

WHITMORE A. WILTZ, *Primary Examiner.*

CHARLES W. LANHAM, *Examiner.*